United States Patent [19]

Kanbe

[11] 4,043,935
[45] Aug. 23, 1977

[54] LIQUID CRYSTAL COMPOSITION HAVING HIGH DIELECTRIC ANISOTROPY AND DISPLAY DEVICE INCORPORATING SAME

[75] Inventor: Sadao Kanbe, Suwa, Japan

[73] Assignee: Kabushiki Kaisha Suwa Seikosha, Tokyo, Japan

[21] Appl. No.: 485,673

[22] Filed: July 3, 1974

[30] Foreign Application Priority Data

July 6, 1973 Japan .................... 48-75765

[51] Int. Cl.² .............. C09K 3/34; G02F 1/13
[52] U.S. Cl. ................... 252/299; 252/408; 350/160 LC
[58] Field of Search ............. 252/299, 408; 350/160 LC

[56] References Cited

U.S. PATENT DOCUMENTS

| 3,773,747 | 11/1973 | Steinstrasser | 252/299 |
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/299 |
| 3,876,286 | 4/1975 | Deutscher et al. | 252/299 |
| 3,881,806 | 5/1975 | Suzuki | 252/299 |
| 3,947,375 | 3/1976 | Gray et al. | 252/299 |
| 3,952,046 | 4/1976 | Scherrer et al. | 252/299 |
| 3,954,653 | 5/1976 | Yamazaki | 252/299 |
| 3,963,311 | 6/1976 | Boller et al. | 350/160 LC |

FOREIGN PATENT DOCUMENTS

| 2,252,132 | 6/1975 | France | 252/299 |
| 2,502,904 | 7/1975 | Germany | 252/299 |
| 2,32 7,036 | 12/1973 | Germany | 252/408 LC |
| 2,306,739 | 8/1973 | Germany | 252/299 |
| 2,139,628 | 2/1973 | Germany | 252/299 |
| 2,321,632 | 11/1974 | Germany | 252/299 |
| 2,024,269 | 12/1971 | Germany | 252/299 |

OTHER PUBLICATIONS

Gray; G. W. et al., Electronics Letters, vol. 9, No. 6, pp. 130-131 (Mar. 22, 1973).

Primary Examiner—Benjamin R. Padgett
Assistant Examiner—T. S. Gron
Attorney, Agent, or Firm—Blum, Moscovitz, Friedman & Kaplan

[57] ABSTRACT

A liquid crystal display device comprising a cell which rotates the plane of polarized light utilizing a composition of high dielectric anisotropy. The composition is stable and is at most only slightly absorptive of light.

8 Claims, 4 Drawing Figures

LIQUID CRYSTAL COMPOSITION HAVING HIGH DIELECTRIC ANISOTROPY AND DISPLAY DEVICE INCORPORATING SAME

BACKGROUND OF THE INVENTION

Liquid crystals are generally divided into three types, nematic, smectic and cholesteric. Most liquid crystal displays utilize nematic liquid crystals. From the optical point of view, nematic liquid crystals are uniaxial and the nematic liquid crystals may be further subdivided as to whether they have positive or negative dielectric anisotropy. The dielectric anisotropy is given by the formula $$\Delta\epsilon = \epsilon_\parallel - \epsilon_\perp$$

where $\epsilon_\parallel$ and $\epsilon_\perp$ are the dielectric constants as determined in the direction parallel to the axis of the molecule and perpendicular to the axis of the molecule, respectively.

The type of display principle to be used with a nematic liquid crystal depends upon whether $\Delta\epsilon$ is positive or negative. Where $\Delta\epsilon$ is positive, namely the liquid crystal material is of positive dielectric anisotropy, it is suitable for use in a display utilizing the FE (field effect) method. Where the anisotropy is negative, the DSM (Dynamic Scattering Mode) is used.

To utilize the FE type liquid crystals, advantage is taken of the fact that the material can be placed between transparent plates which have been unidirectionally rubbed. By orienting the plates with respect to each other so that the directions of rubbing are different, optical rotation is brought about. The FE liquid crystals are active in this respect only in the absence of an electric field. In the presence of an electric field, the molecules align themselves with the major axes thereof in the direction of the electric field. Consequently, in the presence of an electric field, the FE liquid crystals lose their optical rotatary power.

In order to transform FE liquid crystals from the optically active state to the inactive state, the voltage imposed across the material must be above a certain threshold. It is known that the threshold voltage is almost inversely proportional to the square root of the dielectric anisotropy $\Delta\epsilon$. A variety of display cells operating by the FE method are known; however, they suffer from problems with respect to operable life, temperature characteristics, the size of the threshold, etc. As an example of the difficulties encountered, the Schiff bases have been used because of the fact that they are practically colorless. However, the Schiff base liquid crystals are unstable chemically and undergo hydrolysis in the presence of minute quantities of water. Moreover, when subjected to an electric field between conductive electrodes as is the case in a display cell, the materials undergo electrochemical change, either oxidative or reductive, and deteriorate quickly.

Another type of liquid crystal material which has been used in the attempt to avoid instability is the azo type liquid crystal which has an azo coupling near the center of the molecule. However, it is deep red in color so that the legibility of display devices using such a material is poor, particularly when the ambient light level is low.

Liquid crystal material compositions suitable for use by the FE technique are obtained generally by mixing a liquid crystal material of positive dielectric anisotropy having a cyano (nitrile) group, $-C\equiv N$, at one end of the molecule with a second liquid crystal material of negative dielectric anisotropy. Unfortunately, it has not been possible to use substantial quantities of conventional liquid crystal materials having a high dielectric anisotropy in such compositions because of the fact that such compounds as have been known have high melting points. Accordingly, since the $\Delta\epsilon$ for the composition cannot be raised to a high level, it has been necessary to use substantial driving voltages. Under such conditions, either a battery must be used or a booster must be present. Moreover, when such compositions have contained substantial quantities of the positive type liquid crystal, then the temperature range over which the material is in the mesomorphic phase is narrowed, even though by incorporation of such large quantities the threshold driving voltage is lowered. Consequently, such compositions are not suitable for general use in display cells since a relatively small change in the ambient temperature can result in the material losing its ability to rotate polarized light. What is needed, then, are liquid crystal materials having high positive dielectric anisotropy which can be incorporated in sufficient amount into liquid crystal material compositions such that the resultant $\Delta\epsilon$ for the composition is high and the mesomorphic temperature range is wide. In addition, the mesomorphic temperature range, preferably, should include ordinary room temperature.

SUMMARY OF THE INVENTION

A liquid crystal display device in accordance with the present invention has a cell therein, the cell incorporating opposed transparent plates on the interior surfaces of which are one or more conductive transparent segments connectable to an external source of voltage. Each of the plates has been rubbed on the interior surface thereof with gauze, cotton, cotton batting or the like in a single direction, and the plates have been mounted opposite each other so that the rubbing directions of the two plates do not coincide. Preferably, the rubbing directions are at right angles to each other.

Between the plates are placed a liquid crystal composition having a high positive anisotropy, the molecules of such a composition, in the absence of an electric field, tending to orient themselves in the form of a helix, so that the liquid crystal composition is doubly refracting and optically active, these being the properties necessary for rotation of the plane of polarized light passing therethrough. Such a cell is used in combination with a pair of polarizing filters at the exterior surfaces of the cell plates. Also, a reflecting surface which preferably is diffusely reflecting may be placed proximate the exterior surface of the polarizing filter which is further from the region from which the device is to be viewed. Suitable liquid crystal compositions contain at least one type A compound and at least one type B compound where the type A compounds have the general formula:

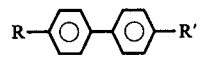

and the type B compounds have the general formula:

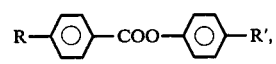

where R and R' are either an n-alkyl or a cyano group, the number of carbon atoms in the alkyl group varying from 3 to 8.

Particularly compatible with the above diphenyl and phenyl ester compounds are azoxy compounds having the following general formula

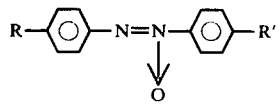

(considered equivalent to

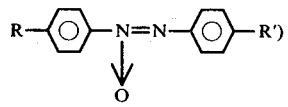

where R and R' are $n-C_nH_{2n+1}$, $n-C_nH_{2n+1}O$, $n-C_nH_{2n+1}COO$, $n-C_nH_{2n+1}OCOO$ or $N\equiv C$. The number of carbons in the alkyl moieties, all of which are normal chain, range from 1 to 8.

Liquid crystal display devices containing compositions as described are available with mesomorphic temperature ranges operable down to $-5°$ C. Moreover, some of these compositions supercool so that they can be operated down to temperatures as low as $-20°$ C. Furthermore, compositions in accordance with the present invention are available which have a threshold voltage as low as 1.5 V so that the voltage of a single cell is sufficient to render the display device of the present invention optically inactive.

Accordingly, an object of the present invention is a liquid crystal display device utilizing nematic liquid crystals of high dielectric anisotropy by the field effect technique for controlling the passage of polarized light through a cell as a means of controlling the display.

Another object of the present invention is a liquid crystal display device utilizing new liquid crystal compositions having a wide mesomorphic temperature range including room temperature.

A further object of the present invention is an improved liquid crystal display device wherein the driving voltage necessary for converting a nematic liquid crystal composition from optically active to optically inactive is as low as 1.5 volts.

An important object of the present invention is an improved liquid crystal display device using nematic liquid crystals of high stability.

A significant object of the present invention is a liquid crystal composition utilizing nematic liquid crystals of high dielectric anisotropy for control of the passage of plane-polarized light through said composition.

Yet another object of the present invention is an improved liquid crystal composition wherein said composition has high dielectric anisotropy, a wide temperature range for the mesomorphic phase, said temperature range including room temperature, and high chemical and electrochemical stability.

Still other objects and advantages of the invention will in part be obvious and will in part be apparent from the specification.

The invention accordingly comprises a composition of matter possessing the characteristics, properties, and the relation of components which will be exemplified in the composition hereinafter described and an article including said composition of matter, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

Figure 1:
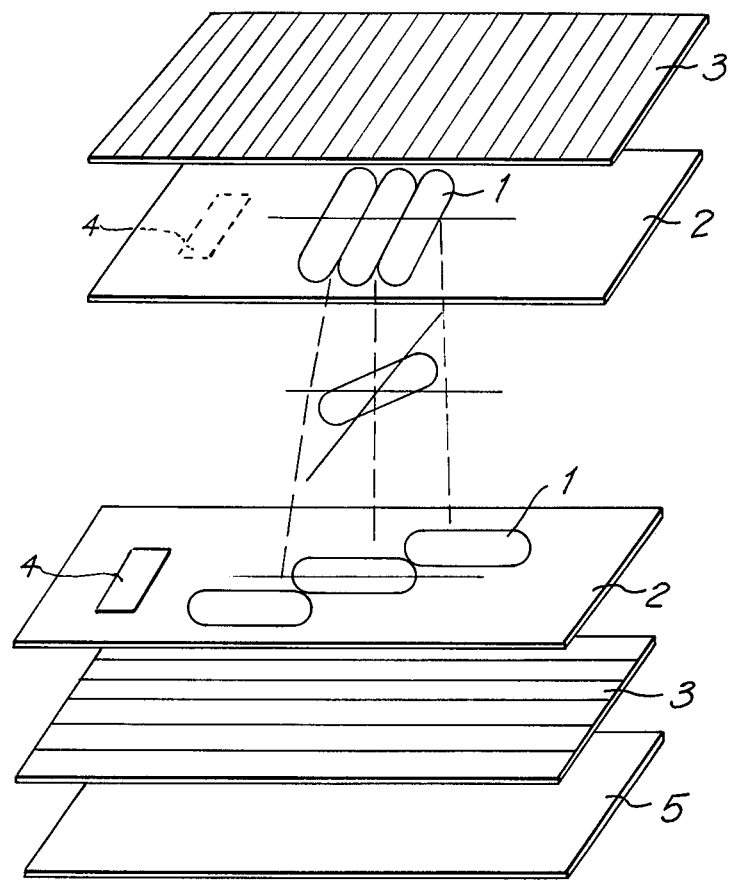
FIG. 1 is a schematic perspective exploded view of a liquid crystal display device in accordance with the present invention.

A liquid crystal display device in accordance with the present invention is shown schematically in FIG. 1, where transparent plates 2 have been unidirectionally rubbed with gauze, cotton, cotton batting, etc., on the inner surfaces thereof. Although the plates 2 can be rubbed and then mounted so that the rubbing directions are at any desired angle to each other, the preferred angle is 90°. Using liquid crystal material having high positive dielectric anisotropy, liquid crystal molecules adjacent each plate tend to align themselves with the rubbing direction of the adjacent plate. Molecules at intermediate positions between the plates take up intermediate orientations. As a result, a helix, generally of one quarter turn in length, is formed between the plates as shown by the molecules 1 illustrated in FIG. 1. Each of the transparent plates forming the cell containing the liquid crystal material has on the interior thereof at least one electrically-conductive, transparent film 4 connectable to an external source of voltage. In the absence of an imposed electric field, the molecules orient themselves as shown in FIG. 1. When an electric field of sufficient strength is imposed across the cell the molecules align themselves with the electric field, as a result of which the composition loses its optical acitivty, but only in those regions across which the electric field is imposed. By selectively activating different conductive, transparent segments on the interior surfaces of the plates 2, various indicia can be shown.

To complete the display, polarizing filters must be placed at the exterior surfaces of the cells formed by transparent plates 1. In the embodiment shown in FIG. 1 the polarization axes of the two filters are at right angles to each other. With such an arrangement, and with the rubbing directions on the two plates at 90° to each other, then, in the absence of an electric field, light passes through the assembly. When an electric field of sufficient intensity is imposed across selected portions of the cell, then these portions become opaque. If the polarization axes of the filters were parallel to each other, then the operation of the cell would be the converse. In other words, the cell would be completely opaque in the absence of an electric field, and in the presence of an electric field on selected portions of the cell, then these portions ofthe cell would become transparent.

The intensity of the display can be increased by placing a reflector, preferably a diffuse reflector below the lower polarization filter, this position normally being furthest from the position from which the display is intended to be viewed. In other words, generally, as shown in FIG. 1, the display would be viewed from above.

Figure 2:
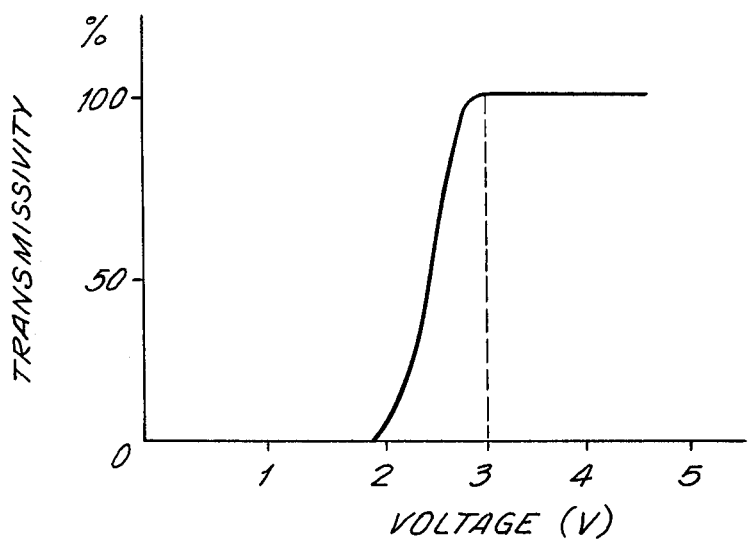
FIG. 2 is a graph of transmissivity versus voltage for an embodiment of the invention.
Figure 3:
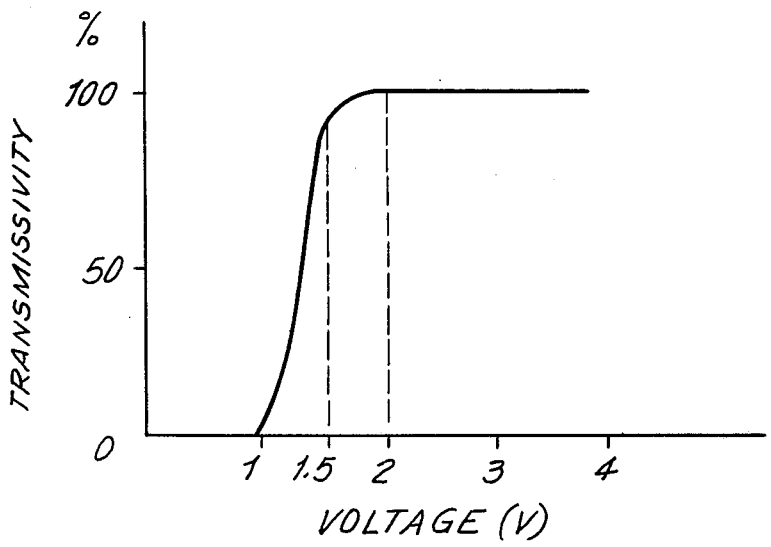
FIG. 3 is a graph of transmissivity versus voltage for another embodiment of the invention.

Compositions of the prior art, for the reasons aforenoted, have not had high positive dielectric anisotropy. Since the threshold voltage necessary for eliminating optical activity is inversely proportional to the square root of the dielectric anisotropy, it has been necessary to use relatively high voltages for operating FE liquid crystal display devices. The compositions of the present invention have sufficiently high dielectric anisotropies so that the liquid crystal display devices can be operated at voltages ranging from about 3 V down to as low as 1.5 V. Such a voltage can be supplied by a single cell rather than a battery or a booster. FIG. 2 shows the transmissivity versus voltage for an embodiment having a threshold voltage of 3V, and FIG. 3 shows the same relationship for a composition for which a voltage of 1.5 circuits shown in block diagram form in FIG. 4 may be used, if desired, with liquid crystal compositions in accordance with the present invention, the booster circuit frequently is unnecessary so far as the display cell is concerned, and, in fact, may be dispensed with.

The liquid crystal compositions of the present invention include type A and type B compounds as defined in the Summary of the Invention. In formulating compositons it is necessary that at least one of the compounds included in the composition be a cyano compound and that enough of this compound be present to raise the dielectric anisotropy to a high positive value. In addition, azoxy compounds have been found to be extremely compatible with the diphenyl and ester liquid crystal materials of the present invention. These azoxy compounds may also include cyano groups. Table I shows three representative type A compounds, three representative type B compounds and five representative azoxy compounds.

TABLE I

| Structural formula | Name | Liquid crystal phase temperature range |
|---|---|---|
| $C_5H_{11}$—⟨O⟩—⟨O⟩—CN | 4-pentyl-4'-cyano-biphenyl | 22.5 to 35° C |
| $C_6H_{13}$—⟨O⟩—⟨O⟩—CN | 4-hexyl-4'-cyano-biphenyl | 13.5 to 28 |
| $C_7H_{15}$—⟨O⟩—⟨O⟩—CN | 4-heptyl-4'-cyano-biphenyl | 28.5 to 42 |
| $C_4H_9$—⟨O⟩—COO—⟨O⟩—CN | 4-cyanophenyl-4'-butylbenzoate | 50 (42)* |
| $C_6H_{13}$—⟨O⟩—COO—⟨O⟩—CN | 4-cyanophenyl-4'-hexylbenzoate | 41.5 to 45.5 |
| $C_5H_{11}$—⟨O⟩—COO—⟨O⟩—$C_4H_9$ | 4-butylphenyl-4'-pentylbenzoate | 9.3 to 15 |
| $CH_3O$—⟨O⟩—N=N(→O)—⟨O⟩—$C_4H_9$ | 4-methoxy-4'-butyl-azoxybenzene | 16 to 72 |
| $CH_3O$—⟨O⟩—N=N(→O)—⟨O⟩—$C_5H_{11}$ | 4-methoxy-4'-pentyl-azoxybenzene | 39 to 89 |
| $C_3H_7CO(=O)$—⟨O⟩—N=N(→O)—⟨O⟩—$C_6H_{13}$ | 4-butyryloxy-4'-hexyl-azoxybenzene | 31.5 to 87.5 |
| $C_6H_{13}O$—⟨O⟩—N=N(→O)—⟨O⟩—CN | 4-hexyloxy-4'-cyano-azoxybenzene | 85 to 134 |
| $C_7H_{15}CO(=O)$—⟨O⟩—N=N(→O)—⟨O⟩—CN | 4-enanthyloxy-4'-cyanoazoxybenzene | 52 to 133 |

Note: Compounds R—⟨O⟩—N=N(→O)—⟨O⟩—R' and R—⟨O⟩—N(→O)=N—⟨O⟩—R' are considered equivalent to each other.
*Monotropic liquid crystal having a melting point of 50° C, exhibiting the liquid crystal phase at and under 42° C.

is adequate to drive the composition to saturation.

Electrochemical cells are available which will provide 1.5 volts, especially at the low current drains used in liquid crystal display devices. Accordingly, while the Table I also shows the temperature range of the liquid crystal phase. The values of the first of the type B compounds are somewhat ambiguous, due, apparently to hysteresis.

The individual compounds have relatively narrow mesomorphic temperature ranges. However, suitable combinations broaden the mesomorphic temperature ranges considerably as will be shown. Moreover, since all of the compounds are substantially white, the display resulting is bright, and the brightness is maintained because of the fact that the compounds are unusually stable. Also, as aforenoted, the voltage which must be imposed to drive the system is substantially lower than with other compounds so that the degradative effect of the imposed voltage is decreased.

A composition having a particularly wide temperature range is the following:

Embodiment 1

| Name | Content by Weight | Liquid crystal phase temperature range |
|---|---|---|
| 4-methoxy-4'-butylazoxybenzene | 40% | |
| 4-methoxy-4'-pentylazoxybenzene | 20% | |
| 4-pentyl-4'-cyanobiphenyl | 20% | |
| 4-cyanophenyl-4'-hexylbenzoate | 20% | −5 to 65° C |

The above liquid crystal composition supercools strongly so that it may be kept at temperatures as low as −20° C for periods in excess of 60 hours. This particular composition requires about 3V for satisfactory operation. The voltage-transmissivity curve for a display cell using said composition is shown in FIG. 2.

A composition which can be driven at 1.5 V although having a somewhat narrower mesomorphic temperature range is the following:

Embodiment 2

| Name | Content by Weight | Liquid crystal phase temperature range |
|---|---|---|
| 4-methoxy-4'-butylazoxybenzene | 20% | |
| 4-pentyl-4'-cyanobiphenyl | 50% | −3 to 57° C |
| 4-cyanophenyl-4'-hexylbenzoate | 30% | |

The composition of Embodiment 2 is slightly yellow due to the fact that it includes an azoxy compound. However, the composition of Embodiment 3 is pure white in color.

Embodiment 3

| Name | Content by Weight | Liquid crystal phase temperature range |
|---|---|---|
| 4-pentyl-4'-cyanobiphenyl | 30% | |
| 4-heptyl-4'-cyanobiphenyl | 20% | |
| 4-cyanophenyl-4'-butylbenzoate | | −5 to 50° C |
| 4-cyanophenyl-4'-hexylbenzoate | 20% | |

The azoxy compounds compatible with the cyanodiphenyls and ester compounds of the present invention have the general formula:

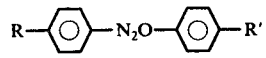

Where R and R' $n-C_nH_{2n+1}$, $n-C_nH_{2n+1}O$, $n-C_nH_{2n+1}COO$, $n-C_nH_{2n+1}OCOO$ or $C\equiv N$, and $n$ ranges from 1 to 8. The azoxy compounds are selected from those which are liquid crystals.

Figure 4:
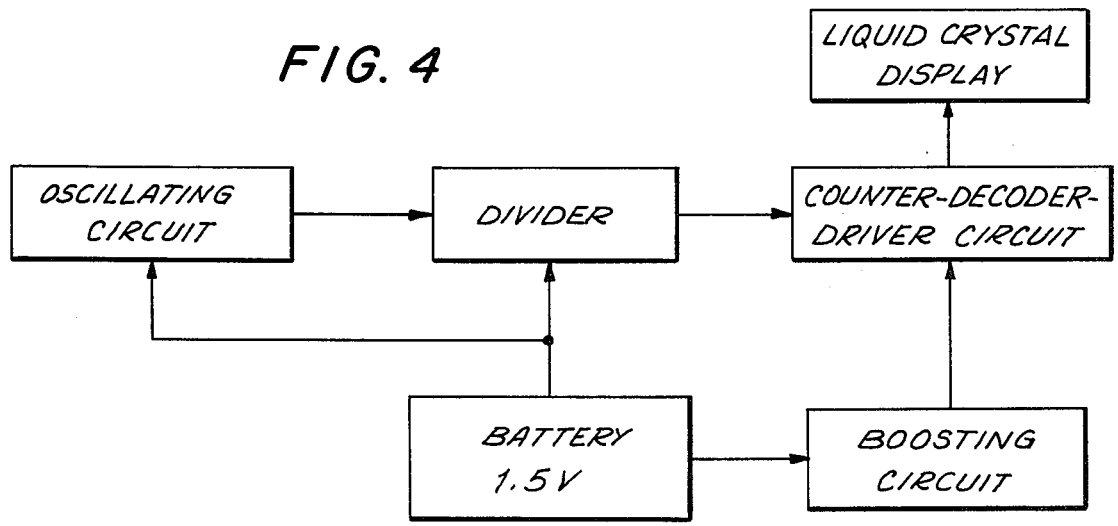
FIG. 4 is a block diagram of circuitry necessary for operation of a liquid crystal display device.

Exemplary circuitry suitable for utilizing a liquid crystal display device in accordance with the present invention where the cell contains liquid crystal compositions in accordance with the present invention is shown in FIG. 4. The particular example represented in FIG. 4 is an embodiment for driving a watch or other timepiece.

It will thus be seen that the objects set forth above, among those made apparent from the preceding description, are efficiently attained and, since certain changes may be made in the above composition of matter and in the article including said composition of matter, without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

What is claimed is:

1. A liquid crystal display device including a liquid crystal cell, a nematic liquid crystal composition of positive dielectric anisotropy therein, said cell being constructed for operation in the Field-Effect Mode, said liquid crystal composition consisting of at least one biphenyl compound selected from the group consisting of 4-pentyl-4'-cyanobiphenyl, 4-hexyl-4'-cyanobiphenyl, 4-heptyl-4'-cyanobiphenyl and at least one ester compound selected from the group consisting of 4-cyanophenyl-4'-butylbenzoate, 4-cyanophenyl-4'-hexylbenzoate and 4-butyl-phenyl-4'-pentylbenzoate.

2. A liquid crystal display device including a liquid crystal cell, a nematic liquid crystal composition of positive dielectric anisotropy therein, said cell being constructed for operation in the Field-Effect-Mode said liquid crystal composition consisting of 40% of 4-methoxy-4'-butylazoxybenzene, 20% of 4-methoxy-4'-pentylazoxybenzene, 20% of 4pentyl-4' -cyanobiphenyl and 20% of 4-cyanophenyl-4'-hexylbenzoate.

3. A liquid crystal display device including a liquid crystal cell, a nematic liquid crystal composition of positive dielectric anisotropy therein, said cell being constructed for operation in the Field-Effect-Mode said liquid crystal composition consisting of 20% of 4-methoxy-4'-butylazoxybenzene, 50% of 4-pentyl-4'-cyanobiphenyl and 30% of 4-cyanophenyl-4'-hexylbenzoate.

4. A liquid crystal display device including a liquid crystal cell, a nematic liquid crystal composition of positive dielectric anisotropy therein, said cell being constructed for operation in the Field-Effect-Mode said liquid crystal composition consisting of 30% of 4-pentyl-4'-cyanobiphenyl, 20% of 4-heptyl-4'-cyanobiphenyl, 30% 4-cyanophenyl-4'-butylbenzoate and 20% of 4-cyanophenyl-4'-hexylbenzoate.

5. A nematic liquid crystal composition having a high positive dielectric anisotropy and suitable for use in a liquid crystal cell, said cell being constructed for operation in the Field-Effect-Mode, said liquid crystal composition consisting of at least one biphenyl compound selected from the group consisting of 4-pentyl-4'-cyanobiphenyl, 4-hexyl-4'-cyanophenyl, 4-heptyl-4'-cyanobiphenyl and at least one ester compound selected from the group consisting of 4-cyanophenyl-4'-butylbenzoate, 4-cyanophenyl-4'-hexylbenzoate and 4-butylphenyl-4'-pentylbenzoate.

6. A nematic liquid crystal composition having a high positive dielectric anisotropy and suitable for use in a liquid crystal cell, said cell being constructed for operation in the Field-Effect-Mode, said liquid crystal composition consisting of 40% of 4-methoxy-4'-butylazoxybenzene, 20% of 4-methoxy-4'-pentylazoxybenzene, 20% of 4-pentyl-4'-cyanobiphenyl and 20% of 4-cyanophenyl-4'-hexylbenzoate.

7. A nematic liquid crystal composition having a high positive dielectric anisotropy and suitable for use in a liquid crystal cell, said cell being constructed for operation in the Field-Effect-Mode, said liquid crystal composition consisting of 20% of 4-methoxy-4'-butylazoxybenzene, 50% of 4-pentyl-4'-cyanobiphenyl and 30% of 4-cyanophenyl-4'-hexylbenzoate.

8. A nematic liquid crystal composition having a high positive dielectric anisotropy and suitable for use in a liquid crystal cell, said cell being constructed for operation in the Field-Effect-Mode, said liquid crystal composition consisting of 30% of 4-pentyl-4'-cyanobiphenyl, 20% of 4-heptyl-4'-cyanodiphenyl, 30% of 4-cyanophenyl-4'-butylbenzoate and 20% of 4-cyanophenyl-4'-hexylbenzoate.

* * * * *